United States Patent

[11] 3,552,368

[72] Inventors James R. Hunter;
Donald O. Ruff; Gerald O. Huntzinger,
Anderson, Ind.
[21] Appl. No. 774,331
[22] Filed Nov. 8, 1968
[45] Patented Jan. 5, 1971
[73] Assignee General Motors Corporation
Detroit, Mich.
a corporation of Delaware

[54] CURRENT RESPONSIVE CONVERTER CIRCUIT
5 Claims, 1 Drawing Fig.
[52] U.S. Cl. .................................................. 123/148,
315/214
[51] Int. Cl. ..................................................... F02p 3/06
[50] Field of Search ........................................... 123/148E,
148DC; 315/209, 209CD, 214

[56] References Cited
UNITED STATES PATENTS
3,316,449 4/1967 Quinn ............................ 315/214
3,335,320 8/1967 Quinn ............................ 315/209
Primary Examiner—Laurence M. Goodridge
Attorneys—W.E. Finken and Richard G. Stahr ABSTRACT: A current responsive converter circuit for producing the charging potential for the ignition capacitor of a capacitor discharge ignition system. The primary winding of the converter transformer, a control resistor and the current carrying electrodes of a switching transistor are connected in series across a direct current potential source. The base electrode of the switching transistor is connected to the emitter electrode of a trigger transistor which is maintained normally nonconducting by a normally conducting control transistor. An externally generated ignition signal applied across the base-emitter electrodes of the trigger transistor triggers this device conductive through the collector-emitter electrodes thereof to complete a base-emitter circuit for the switching transistor which, consequently, conducts through the collector-emitter electrodes thereof. The conducting switching transistor establishes an energizing circuit for the series connected primary winding and control resistor and substantially removes the base drive current from the control transistor to extinguish this device. The resulting potential drop across the control resistor is applied across the base-emitter electrodes of the control transistor in a polarity relationship to produce base-emitter and, consequently, collector-emitter conduction therethrough when the current flow through the control resistor produces a potential drop of a predetermined magnitude to provide a circuit in shunt with the base-emitter electrodes of the trigger transistor to extinguish this device and, consequently, the switching transistor.

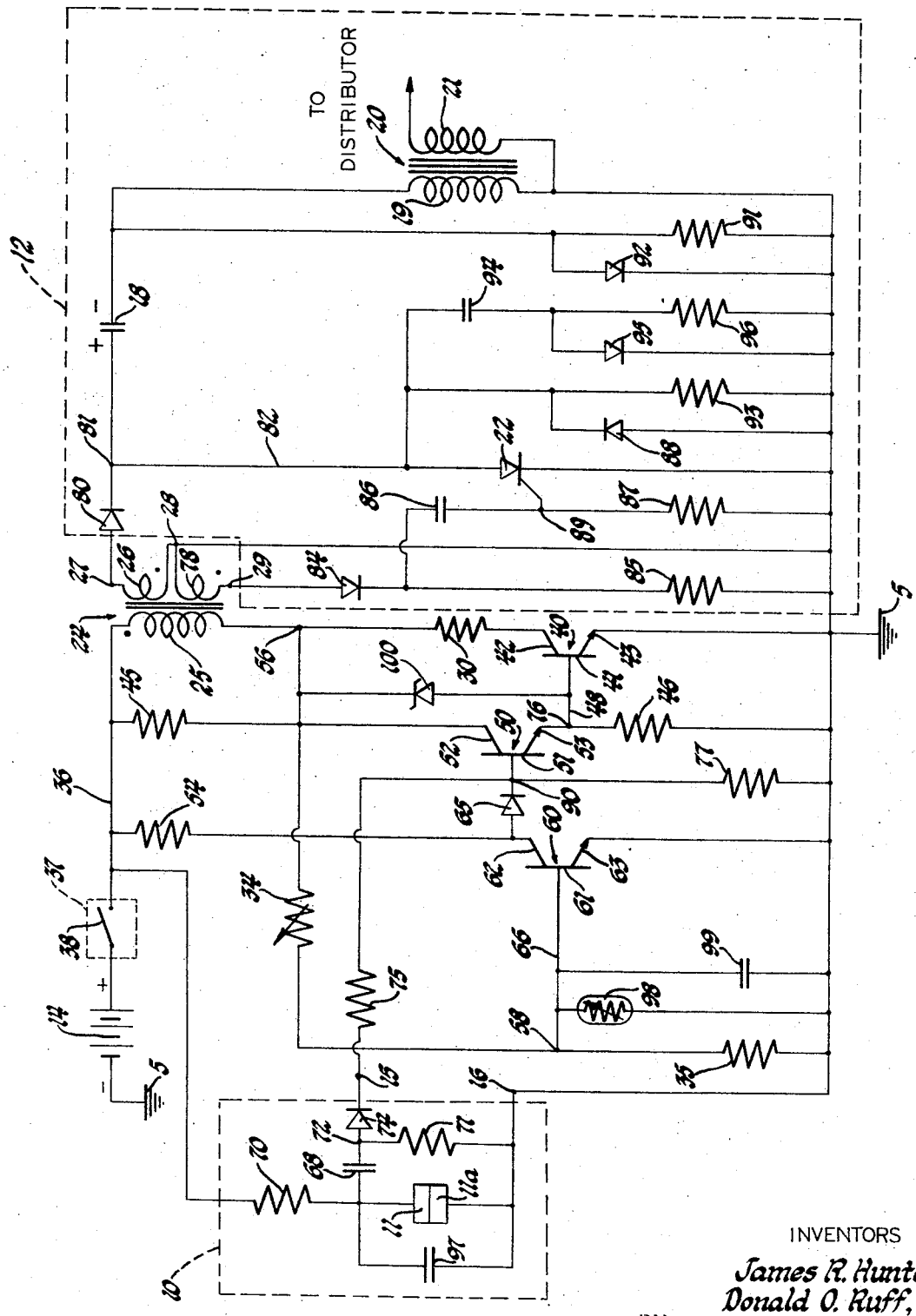

CURRENT RESPONSIVE CONVERTER CIRCUIT

This invention is directed to a current responsive converter circuit and, more specifically, to a current responsive converter circuit for producing the potential which provides the charge upon the ignition capacitor of a capacitor discharge ignition system.

To produce the maximum charging potential for the ignition capacitor of a capacitor discharge ignition system with any given converter transformer, the energizing current through the primary winding thereof should be permitted to rise to the greatest possible magnitude. With prior art devices, the energizing time for the primary winding of the converter transformer is limited to a specific time, usually established by an oscillator circuit, which does not permit the energizing current to build up to its maximum magnitude. Therefore, a current responsive converter circuit which permits maximum current build up through the primary winding of the converter transformer before the energizing circuit therefor is interrupted is desirable.

It is, therefore, an object of this invention to provide an improved converter circuit for producing the potential which provides the charge upon the ignition capacitor of a capacitor discharge ignition system.

It is another object of this invention to provide an improved converter circuit for producing the potential which provides the charge upon the ignition capacitor of a capacitor discharge ignition system which is responsive to the magnitude of current flow through the primary winding of the converter transformer to interrupt the converter transformer primary winding energizing circuit.

In accordance with this invention, a current responsive converter circuit for producing the potential which provides the charge upon the ignition capacitor of a capacitor discharge ignition system is provided wherein a potential drop of a predetermined magnitude across a control resistor, connected in series with the primary winding of the converter transformer and the current carrying electrodes of a conducting switching transistor across a direct current potential source, produced by primary winding energizing current flow triggers a control transistor conductive through the collector-emitter electrodes to extinguish a trigger transistor and the switching transistor.

For a better understanding of the present invention, together with additional objects, advantages and features thereof, reference is made to the following description and accompanying single FIG. schematic drawing.

As point of reference or ground potential is the same point electrically throughout the circuit, it has been represented by the accepted schematic symbol and referenced by the numeral 5 throughout the FIG.

Referring to the FIG., the current responsive converter circuit of this invention is schematically set forth in an internal combustion engine capacitor discharge ignition system including a source of ignition signals produced in timed relationship with the internal combustion engine with which the ignition system is being used, schematically shown within dashed rectangle 10, and a system output circuit, schematically shown within dashed rectangle 12, and in combination with a direct current potential source which may be a conventional storage battery 14.

The source of ignition signals may be a pair of conventional automotive ignition breaker points 11 and 11a, which are located within the ignition distributor and are opened and closed in timed relationship with the internal combustion engine with which the ignition system is being used by a rotating lobed cam in a manner well known in the automotive art, and the associated circuitry within dashed rectangle 10, which will be explained in detail later in this specification. The source of ignition signals 10 may be connected to the converter circuit of this invention through the input circuit thereof which may be terminals 15 and 16 or any other device suitable for connection to external circuitry.

The system output circuit includes an ignition capacitor 18 and a charging circuit therefor which will be explained in detail later in this specification, the primary winding 19 of a conventional ignition coil 20, which also has a secondary winding 21, and an ignition capacitor switch, which may be a silicon controlled rectifier 22, for connecting the ignition capacitor 18 across the ignition coil primary winding 19 in a manner to be explained in detail later in this specification.

The current responsive converter circuit of this invention includes a converter transformer 24 having a primary winding 25 and a secondary output winding 26 across which external utilization circuitry may be connected through terminals 27 and 28 or similar electrical devices suitable for connection to external circuitry, a control impedance element, shown in the FIG. as a resistor 30, and a controllable switching device, shown in the FIG. as a type NPN transistor 40, having a control electrode and two current carrying electrodes connected in series with primary winding 25 of converter transformer 24 and control resistor 30 across direct current potential source 14, a trigger circuit for producing a trigger signal in response to each ignition signal, shown in the FIG. as a type NPN transistor 50 and the associated circuitry, a control circuit responsive to the potential drop across the control impedance element 30 for disenabling the trigger circuit when the potential drop across control impedance element 30 has reached a predetermined magnitude, shown in the FIG. as a type NPN transistor 60, and the associated circuitry, and a circuit for applying the potential drop which appears across the control impedance element 30 to the control circuit, shown in the FIG. as series resistors 34 and 35.

The current carrying electrodes of type NPN switching transistor 40, collector electrode 42 and emitter electrode 43, are connected in series with primary winding 25 of converter transformer 24 and control impedance element 30 across direct current potential source 14 for establishing and interrupting the energizing circuit for the series connected primary winding and control impedance element. One end of primary winding 25 of converter transformer 24 is connected to the positive polarity terminal of direct current potential source 14 upon the closure of movable contact 38 of single pole — single throw switch 37, which may be a switching element within an automotive type ignition switch, through positive polarity line 36 and the emitter electrode 43 of switching transistor 40 is connected to the negative polarity terminal of direct current potential source 14 through point of reference or ground potential 5.

The current carrying electrodes of type NPN trigger transistor 50, collector electrode 52 and emitter electrode 53, are connected across direct current potential source 14 and the control electrode and a selected one of the current carrying electrodes thereof, base electrode 51 and emitter electrode 53, are connected across input circuit terminals 15 and 16 for producing a trigger signal in response to an input ignition signal applied across input terminals 15 and 16 in a polarity relationship to produce conduction through the current carrying electrodes of trigger transistor 50. The collector electrode 52 of trigger transistor 50 is connected to the positive polarity terminal of direct current potential source 14 upon the closing of movable contact 38 of switch 37 through the parallel combination of resistor 45 and primary winding 25 and positive polarity line 36 and emitter electrode 53 thereof is connected to the negative polarity terminal of direct current potential source 14 through resistor 46 and point of reference or ground potential 5.

The trigger signals produced by trigger transistor 50 and the associated circuitry in response to an input ignition signal applied across input circuit terminals 15 and 16 appear across resistor 46, in a manner to be later explained, and are applied across the control electrode and one of the current carrying electrodes of switching transistor 40, base electrode 41 and emitter electrode 43, through lead 48, through which base electrode 41 of switching transistor 40 is connected to the emitter electrode 53 of trigger transistor 50, and point of reference or ground potential 5 in a polarity relationship to produce conduction through the current carrying electrodes of switching transistor 40.

A type NPN control transistor 60 having two current carrying electrodes, collector electrode 62 and emitter electrode 63, connected across the direct current potential source 14 and a control electrode, base electrode 61, is provided for extinguishing trigger transistor 50 when the current flow through control impedance element 30 produces a potential drop thereacross of a predetermined magnitude. The collector electrode 62 of control transistor 60 is connected to the positive polarity terminal of direct current potential source 14 upon the closing of movable contact 38 of switch 37 through resistor 54 and positive polarity line 36 and the emitter electrode 63 is connected to the negative polarity terminal of direct current potential source 14 through point of reference or ground potential 5.

A control electrode bias circuit for control transistor 60 is interconnected in the converter circuit and with the base electrode 61 of control transistor 60 in a manner to extinguish control transistor 60 with each input ignition signal applied across input circuit terminals 15 and 16 and to maintain control transistor 60 nonconductive until the potential drop across control impedance element 30 has reached a predetermined magnitude. This control electrode bias circuit comprises series connected resistors 34 and 35. Resistors 34 and 35 are connected in series across the positive and negative polarity terminals of direct current potential source 14 upon the closure of movable contact 38 of switch 37 through the parallel combination of primary winding 25 of converter transformer 24 and resistor 45 and positive polarity line 36 on the positive polarity end and through point of reference or ground potential 5 on the negative polarity end. The positive polarity end of series resistors 34 and 35 are also connected to the collector electrode 42 of switching transistor 40 through control impedance element 30. The control electrode of control transistor 60, base electrode 61, is connected to junction 58 between series resistors 34 and 35 through lead 66.

In the circuit arrangement set forth in the FIG., the potential drop across control impedance element 30 is of a positive polarity with respect to point of reference or ground potential 5 at junction 56. Consequently, the potential appearing across control impedance element 30 is applied across the control electrode and one of the current carrying electrodes of control transistor 60, base electrode 61 and emitter electrode 63, through the control electrode bias circuit series resistors 34 and 35 and point of reference or ground potential 5. With one possible alternate circuit arrangement, control impedance element 30 may be connected in series between the emitter electrode 43 of switching transistor 40 and point of reference or ground potential 5. With this arrangement, the potential drop across impedance element 30 would also appear at junction 56 between collector electrode 42 of switching transistor 40 and primary winding 25 and would be applied across the base-emitter electrodes of control transistor 60 through the same bias circuit connected between base electrode 61 of control transistor 60 and junction 56 between collector electrode 42 of switching transistor 40 and primary winding 25.

To divert control electrode current from trigger transistor 50 while control transistor 60 is conducting, the current carrying electrodes of control transistor 60, collector electrode 62 and emitter electrode 63, are connected in shunt with the control electrode of trigger transistor 50, base electrode 51, through diode 65. Diode 65 is provided in this circuit to isolate the input ignition signals applied across input circuit terminals 15 and 16 from control transistor 60.

Upon the closure of movable contact 38 of switch 37, which may be one of the poles of a conventional automotive ignition switch, battery potential appears across positive polarity line 36 and point of reference or ground potential 5. Therefore, a direct current potential of a polarity which is positive with respect to ground is applied across the collector-emitter electrodes of each of type NPN transistors 40, 50 and 60 which is the correct collector-emitter polarity relationship for transistors of this type.

Current flow through the control electrode bias circuit for control transistor 60 produces a potential drop across resistor 35, of a positive polarity at junction 58 with respect to point of reference or ground potential 5, which is applied through lead 66 and point of reference or ground potential 5 across the base-emitter electrodes of type NPN transistor 60. As this is the correct base-emitter potential polarity relationship to produce base-emitter current flow and, consequently, collector-emitter current flow through a type NPN transistor, control transistor 60 is normally conducting through the collector-emitter electrodes thereof.

As the collector-emitter electrodes of control transistor 60 are connected in shunt with the base-emitter electrodes of trigger transistor 50 through diode 65, base drive current for trigger transistor 50 is diverted away to ground 5 through the collector-emitter electrodes of conducting control transistor 60. Consequently, trigger transistor 50 is normally not conducting.

With trigger transistor 50 not conducting, the base drive circuit of switching transistor 40 is interrupted thereby, consequently, switching transistor 40 is normally not conducting and there is no current flow through primary winding 25.

Upon each opening of conventional breaker contact points 11 and 11a, the low resistance shunt is removed from around coupling capacitor 68, consequently, this device charges through resistor 70 and resistor 71. The input ignition signals which appear across resistor 71 as a result of charging current flow through coupling capacitor 68 are of a positive polarity at junction 72 with respect to point of reference or ground potential 5 and are applied across the base-emitter electrodes of trigger transistor 50 through the series combination of diode 74, input circuit terminal 15, resistor 75 and resistor 77 and input terminal 16, point of reference or ground potential 5 and resistor 46 and all of the correct potential polarity relationship to produce base-emitter current flow and, consequently, collector-emitter current flow through a type NPN transistor. Therefore, trigger transistor 50 is triggered conductive through the collector-emitter electrodes thereof upon the application of each input ignition signal across the base-emitter electrodes thereof.

Upon the triggering of trigger transistor 50 conductive, a circuit is established across direct current potential source 14 through series connected resistor 45, primary winding 25 in parallel therewith, the collector-emitter electrodes of trigger transistor 50 and series resistor 46. The resulting current flow through resistor 46 produces a trigger signal thereacross which is of a positive polarity at junction 76 with respect to point of reference or ground potential 5. This trigger signal is applied through lead 48 and point of reference or ground potential 5 across the base-emitter electrodes of switching transistor 40 and is of the correct polarity relationship to produce base-emitter current flow and, consequently, collector-emitter current flow through a type NPN transistor. Consequently, type NPN switching transistor is triggered conductive through the collector-emitter electrodes by the trigger signals produced by the trigger circuit.

Conducting switching transistor 40 connects the positive polarity end, junction 56, of control transistor base bias circuit series resistors 34 and 35 to point of reference or ground potential 5 through control resistor 30, a condition which results in a potential across junction 56 and point of reference or ground potential 5 which is of a positive polarity upon junction 56 with respect to point of reference or ground potential 5 and of a magnitude equal to the potential drop across control resistor 30 and the collector-emitter electrodes of switching transistor 40. Therefore, control resistor 30 is selected to have a resistance value which, upon the initial conduction of switching transistor 40, will result in a total potential drop across the series combination of control resistor 30 and the collector-emitter electrodes of switching transistor 40 of an insufficient magnitude to maintain base drive current through the base-emitter electrodes of control transistor 60, thereby extinguishing this device. The factors which must be considered in the determination of the precise resistance value of control resistor 30 will be set forth later in this specification.

With control transistor 60 extinguished upon the initial conduction of switching transistor 40, a base drive circuit for maintaining base-emitter current flow through trigger transistor 50 is established through the series combination of resistor 54, diode 65, the base-emitter electrodes of trigger transistor 50 and resistor 46, connected across direct current potential source 14, to maintain trigger transistor 50 and, consequently, switching transistor 40 conductive.

Conducting switching transistor 40 also establishes an energizing circuit for the series combination of primary winding 25 of converter transformer 24 and control resistor 30 across direct current potential source 14 through movable contact 38 of switch 37, positive polarity line 36, the series combination of primary winding 25 and control resistor 30, the collector-emitter electrodes of conducting switching transistor 40 and point of reference or ground potential 5.

With the energizing circuit completed for primary winding 25 of converter transformer 24, energizing current which increases in magnitude, flows through primary winding 25 of converter transformer 24 and produces an increasing primary winding 25 magnetic field which induces a potential in secondary winding 26 thereof of a positive polarity at terminal 28 with respect to terminal 27, and a potential in switch winding 78 of a positive polarity at terminal 29 with respect to terminal 28. Blocking diode 80 prevents the flow of current through secondary winding 26, consequently, the potential induced in secondary winding 26 is of no effect. The purpose of the potential induced in switch winding 78 will be explained in detail later in this specification.

As energizing current flow through primary winding 25 of converter transformer 24 and control resistor 30 continues to increase in magnitude, the potential upon junction 56, which is substantially the potential drop across control resistor 30, increases in magnitude and is of a positive polarity upon junction 56 with respect to point of reference or ground potential 5. This positive polarity potential signal is applied across the base-emitter electrodes of control transistor 60 through series resistors 34 and 35 and point of reference or ground potential 5 in the correct polarity relationship to produce base-emitter current flow through type NPN control transistor 60. When the potential drop across control resistor 30 reaches the predetermined magnitude, this signal produces base-emitter and, consequently, collector-emitter conduction through control transistor 60.

Conducting control transistor 60 diverts base current from trigger transistor 50 to extinguish this device. With trigger transistor 50 extinguished, the trigger signal appearing across resistor 46 is removed from across the base-emitter electrodes of switching transistor 40, consequently, switching transistor 40 extinguishes to interrupt the energizing circuit for primary winding 25 of converter transformer 24.

The resulting collapsing primary winding 25 magnetic field induces the ignition capacitor 18 charging potential in secondary winding 26 thereof, which is of a positive polarity at terminal 27 with respect to terminal 28, and a potential in switch winding 78, which is of a positive polarity at terminal 28 with respect to terminal 29. The ignition capacitor 18 charging potential induced in secondary winding 26 charges ignition capacitor 18 through a circuit which may be traced from terminal 27, through diode 80, ignition capacitor 18, the parallel combination of primary winding 19 of ignition coil 20, resistor 91 and diode 92 and point of reference or ground potential 5 to the other terminal 28 of secondary winding 26. Ignition capacitor 18 is now charged with an ignition potential with the plate thereof connected to junction 81 being of a positive polarity with respect to the other plate. Diode 84 prevents the flow of current through switch winding 78, consequently, the potential induced in switch winding 78 is of no effect.

The magnitude of the ignition capacitor 18 charging potential induced in secondary winding 26 of converter transformer 24 upon the collapse of the primary winding 25 magnetic field when switching transistor 40 is extinguished to interrupt the energizing circuit for primary winding 25 is determined by the intensity of the primary winding 25 magnetic field. The primary winding 25 magnetic field intensity is a function of the magnitude of energizing current flow therethrough. Therefore, to produce an ignition capacitor charging potential of a selected magnitude with any selected converter transformer, a specific magnitude of primary winding energizing current flow is required. Control resistor 30, therefore, must be of a resistance value which, with the required magnitude of primary winding energizing current flow therethrough, will result in a potential drop thereacross of a magnitude which will initiate base-emitter current flow through the type NPN transistor which is selected as control transistor 60. The potential drop of a predetermined magnitude across control resistor 30, therefore, is the product of the resistance value of control resistor 30 in ohms multiplied by the magnitude of primary winding 25 energizing current in amperes required to produce an ignition capacitor charging potential of a selected magnitude. In a practical application, a control resistor of a resistance value of .05 ohms operated satisfactorily.

The charge upon ignition capacitor 18 is applied across the anode-cathode electrodes of silicon controlled rectifier ignition capacitor switch 22 through lead 82 and through the primary winding 19 of ignition coil 20 and point of reference or ground potential 5. As the polarity of the charge upon ignition capacitor 18 is positive upon the plate connected to junction 81, the polarity of the potential applied across the anode-cathode electrodes of silicon controlled rectifier ignition capacitor switch 22 is positive upon the anode electrode and negative upon the cathode electrode.

The silicon controlled rectifier is a semiconductor device having a control electrode, generally termed the gate electrode, and two current carrying electrodes, generally termed the anode and cathode electrodes, which is designed to normally block current flow in either direction. With the anode and cathode electrodes forward poled, anode positive and cathode negative, the silicon controlled rectifier may be triggered to conduction upon the application, to the control electrode, of a control potential signal of a polarity which is positive in respect to the potential present upon the cathode electrode and of sufficient magnitude to produce control electrode-cathode, or gate, current. In the conducting state, the silicon controlled rectifier will conduct current in one direction and retains the ability to block current flow in the opposite direction. In the conducting state, therefore, the silicon controlled rectifier functions as a conventional diode. Upon being triggered to conduction, however, the control electrode is no longer capable of affecting the device which will remain in the conducting state until either the anode-cathode circuit is interrupted or the polarity of the potential applied across the anode-cathode electrodes is reversed. Of these two alternatives, the reversal of the polarity of the potential across the anode-cathode electrodes thereof is perhaps the most satisfactory.

Upon the next opening of breaker contacts 11 and 11a, the sequence of events just described is repeated. With the next initiation of conduction of switching transistor 40, the increasing primary winding 25 magnetic field produced as a result of increasing energizing current flow therethrough induces a potential in switch winding 78 of a positive polarity at terminal 29 with respect to terminal 28. This potential produces a current flow through a circuit which may be traced from terminal 29, through diode 84, the parallel combination of resistor 85 and series connected capacitor 86 and resistor 87 and point of reference or ground potential 5 to terminal 28. The capacitor 86 charging current flows through resistor 87 and produces a potential signal thereacross which is of a positive polarity at junction 89 with respect to point of reference of ground potential 5. This signal is applied across the gate-cathode electrodes of silicon controlled rectifier ignition capacitor switch 22 in the proper polarity relationship to produce gate current through this device. As the charge on ignition capacitor 18 is applied across the anode-cathode electrodes of silicon controlled rectifier ignition capacitor switch 22 in the correct anode-cathode polarity relationship, this device conducts through the anode-cathode electrodes thereof to connect ignition capacitor 18 across the ignition coil primary winding 19. Consequently, ignition capacitor 18 discharges rapidly through primary winding 19 of ignition coil 20 and the discharge current produces a magnetic field which induces a high firing potential in secondary winding 21. The firing potential is directed to the ignition coil terminal of a conventional automotive-type distributor, not shown.

With an open ignition coil secondary, the series L-C circuit comprising primary winding 19 of ignition coil 20 and ignition capacitor 18 produces a ringing action which charges ignition capacitor 18 in the reverse direction. Ignition capacitor 18 then discharges in the reverse direction through primary winding 19. The ring back of ignition capacitor 18 in a reverse direction extinguishes silicon controlled rectifier 22 and charges ignition capacitor 18 in the forward direction through diode 88 which prevents the application of the high inverse polarity potential of ignition capacitor 18 when discharging in the reverse direction across the anode-cathode electrodes of silicon controlled rectifier ignition capacitor switch 22. As ignition capacitor 18 attempts to discharge in the forward direction with silicon controlled rectifier ignition capacitor switch 22 not conducting, the potential applied across the anode-cathode electrodes thereof rise rapidly. Capacitor 94 and the parallel combination of diode 95 and resistor 96 act as a filter which reduces the potential buildup, thereby preventing the triggering of silicon controlled rectifier ignition capacitor switch 22 conductive through the anode-cathode electrodes because of the rapid dE/dt applied across the anode-cathode electrodes thereof.

Diode 92 is a "free wheeling" diode in parallel with ignition coil primary winding 19 to rapidly dampen the oscillations through primary winding 19 while the ignition system is firing across a spark plug gap; resistor 93 is a "bleeder" resistor through which ignition capacitor 18 discharges when switch 37 is opened; capacitor 97 within dashed rectangle 10 is the conventional ignition capacitor normally connected in shunt with the breaker contacts of an automotive distributor; thermistor 98 is connected as shown to provide temperature compensation; capacitor 99 is a filter capacitor and Zener diode 100 is connected as shown to provide protection for switching transistor 40 in the event ignition coil 20 becomes disconnected from the remainder of the circuit. Resistor 91 provides a "bleeder" circuit for ignition capacitor 18 in the event ignition coil 20 should become disconnected.

In the FIG., a single switching transistor 40 is shown, the control circuit is shown to include a single transistor 60, and the control impedance element is shown to be a single resistor 30. With some applications, it may be desirable to employ two transistors in the switching and/or the control circuits connected in a "Darlington Pair" and parallel resistors for the control impedance element.

Throughout the specification, specific transistor types, electrical polarities and circuit elements have been set forth. It is to be specifically understood, however, that alternate transistor types and compatible electrical polarities and alternate circuit elements possessing similar electrical characteristics may be substituted without departing from the spirit of the invention.

While a preferred embodiment of the present invention has been shown and described, it will be obvious to those skilled in the art that various modifications and substitutions may be made without departing from the spirit of the invention which is to be limited only within the scope of the appended claims.

We claim:

1. In a capacitor discharge ignition system of the type including a source of ignition signals produced in timed relationship with the internal combustion engine with which the ignition system is being used and a system output circuit including at least an ignition capacitor and a charging circuit including at least an ignition capacitor and a charging circuit therefor, the primary winding of an ignition coil and an ignition capacitor switch for connecting the ignition capacitor across the ignition coil primary winding, the current responsive converter circuit for producing the potential which provides the charge upon the ignition capacitor comprising in combination with a direct current potential source, a transformer having at least a primary winding and a secondary output winding across which the system output circuit may be connected, a controllable switching device having two current carrying electrodes and a control electrode, a control impedance element, means for connecting said primary winding of said transformer, said control impedance element and said current carrying electrodes of said controllable switching device in series across said direct current potential source, a trigger circuit for producing a trigger signal in response to each said ignition signal, means for applying said trigger signals to said control electrode of said controllable switching device in a polarity relationship which will produce conduction through said current carrying electrodes thereof for establishing an energizing circuit for said series connected primary winding and control impedance element across said direct current potential source, a control circuit responsive to the potential drop across said control impedance element for disenabling said trigger circuit when said potential drop across said control impedance element has reached a predetermined magnitude and means for applying said potential drop appearing across said control impedance element to said control circuit.

2. In a capacitor discharge ignition system of the type including a source of ignition signals produced in timed relationship with the internal combustion engine with which the ignition system is being used and a system output circuit including at least an ignition capacitor and a charging circuit therefor, the primary winding of an ignition coil and an ignition capacitor switch for connecting the ignition capacitor across the ignition coil primary winding, the current responsive converter circuit for producing the potential which provides the charge upon the ignition capacitor comprising in combination with a direct current potential source, a transformer having at least a primary winding and a secondary output winding across which the system output circuit may be connected, a switching transistor having two current carrying electrodes and a control electrode, a control impedance element, means for connecting said primary winding of said transformer, said control impedance element and said current carrying electrodes of said switching transistor in series across said direct current potential source, a trigger transistor having two current carrying electrodes and a control electrode, means for connecting said current carrying electrodes of said trigger transistor across said direct current potential source, a control transistor having two current carrying electrodes and a control electrode, means for connecting said current carrying electrodes of said control transistor across said direct current potential source, means for connecting said current carrying electrodes of said control transistor in shunt across said control electrode and one of said current carrying electrodes of said trigger transistor, means for connecting said control electrode of said switching transistor to a selected one of said current carrying electrodes of said trigger transistor, means for applying the source of ignition signals across said control electrode and one of said current carrying electrodes of said trigger transistor and means for applying the potential drop appearing across said control impedance element across said control electrode and one of said current carrying electrodes of said control transistor.

3. A current responsive converter circuit for producing the potential which provides the charge upon the ignition capacitor of a capacitor discharge ignition system comprising in combination with a direct current potential source, an input circuit means, a transformer having a primary winding and at least a secondary output winding across which external utilization circuitry may be connected, a control impedance element, a switching transistor having two current carrying electrodes connected in series with said primary winding of said transformer and said control impedance element across said direct current potential source and a control electrode for establishing and interrupting the energizing circuit for said series connected primary winding and control impedance element, a trigger transistor having two current carrying electrodes connected across said direct current potential source and a control electrode and a selected one of said current carrying electrodes connected across said input circuit means for producing a trigger signal in response to an input ignition signal applied across said input circuit means in a polarity relationship to produce conduction through said current carrying electrodes thereof, means for applying said trigger signal across said control electrode and one of said current carrying electrodes of said switching transistor in a polarity relationship to produce conduction through said current carrying electrodes thereof, a control transistor having two current carrying electrodes connected across said direct current potential source and a control electrode for extinguishing said trigger transistor when current flow through said control impedance element produces a potential drop thereacross of a predetermined magnitude, a control electrode bias circuit for said control transistor interconnected in said converter circuit and with said control electrode of said control transistor in a manner to extinguish said control transistor with each input signal applied across said input circuit means and to maintain said control transistor nonconducting until said potential drop across said control impedance element has reached the predetermined magnitude, means for applying said potential appearing across said control impedance element across said control electrode and one of said current carrying electrodes of said control transistor in a polarity relationship to produce conduction through said current carrying electrodes thereof and means for connecting said current carrying electrodes of said control transistor in shunt with said control electrode and one of said current carrying electrodes of said trigger transistor for diverting control electrode current from said trigger transistor while said control transistor is conducting.

4. A current responsive converter circuit for producing the potential which provides the charge upon the ignition capacitor of a capacitor discharge ignition system comprising in combination with a direct current potential source having positive and negative polarity terminals, an input circuit means, a transformer having a primary winding and at least a secondary output winding across which external utilization circuitry may be connected, a control resistor, a switching transistor having collector and emitter electrodes connected in series with said primary winding of said transformer and said control resistor across said positive and negative polarity terminals of said direct current potential source and a base electrode for establishing and interrupting the energizing circuit for said series connected said primary winding and control resistor, a trigger transistor having collector and emitter electrodes connected across said positive and negative polarity terminals of said direct current potential source, respectively, and a base electrode and said emitter electrode connected across said input circuit means for producing a trigger signal in response to an input ignition signal applied across said input circuit means in a polarity relationship to produce conduction through said collector-emitter electrodes thereof, means for applying said trigger signal across said base electrode and said emitter electrode of said switching transistor in a polarity relationship to produce conduction through said collector-emitter electrodes thereof, a control transistor having collector and emitter electrodes connected across said positive and negative polarity terminals of said direct current potential source, respectively, and a base electrode for extinguishing said trigger transistor when current flow through said control resistor produces a potential drop thereacross of a predetermined magnitude, a base electrode bias circuit for said control transistor interconnected in said converter circuit and with said base electrode of said control transistor in a manner to extinguish said control transistor with each input signal applied across said input circuit means and to maintain said control transistor nonconducting until said potential drop across said control resistor has reached the predetermined magnitude, means for applying said potential appearing across said control resistor across said base electrode and said emitter electrode of said control transistor in a polarity relationship to produce conduction through said collector-emitter electrodes thereof and means for connecting said base electrode of said trigger transistor to said collector electrode of said control transistor.

5. In a capacitor discharge ignition system of the type including a source of ignition signals produced in timed relationship with the internal combustion engine with which the ignition system is being used and a system output circuit including at least an ignition capacitor and a charging circuit therefor, the primary winding of an ignition coil and an ignition capacitor switch for connecting the ignition capacitor across the ignition coil primary winding, the current responsive converter circuit for producing the potential which provides the charge upon the ignition capacitor comprising in combination with a direct current potential source having positive and negative polarity terminals, a transformer having at least a primary winding and a secondary output winding across which the system output circuit may be connected, a switching transistor having collector, emitter and base electrodes, a control resistor, means for connecting said primary winding of said transformer, said control resistor and said collector-emitter electrodes of said switching transistor in series across said direct current potential source, a trigger transistor having collector, emitter and base electrodes, a first and a second resistor, means for connecting said first resistor, said collector-emitter electrodes of said trigger transistor and said second resistor in series across said positive and negative polarity terminals of said direct current potential source in that order, a control transistor having collector, emitter and base electrodes, a third resistor, means for connecting said third resistor and said collector-emitter electrodes of said control transistor in series across said positive and negative polarity terminals of said direct current potential source in that order, fourth and fifth resistors, means for connecting said fourth and fifth resistors in series across said direct current potential source, means for connecting said base electrode of said control transistor to the junction between said fourth and fifth resistors, means for connecting said base electrode of said trigger transistor to said collector electrode of said control transistor, means for connecting said base electrode of said switching transistor to said emitter electrode of said trigger transistor, means for applying the source of ignition signals across said base-emitter electrodes of said trigger transistor and means for connecting the positive polarity end of said fourth and fifth resistors to said collector electrode of said switching transistor.

PO-1050
(5/69)

UNITED STATES PATENT OFFICE
CERTIFICATE OF CORRECTION

Patent No. 3,552,368  Dated  January 5, 1971

Inventor(s)  James R. Hunter et al

It is certified that error appears in the above-identified patent and that said Letters Patent are hereby corrected as shown below:

Column 8, line 3, delete "including"; line 4, delete "at least an ignition capacitor and a charging circuit"; line 19, after the comma insert -- means for applying said ignition signals to said trigger circuit, --.

Signed and sealed this 13th day of April 1971.

(SEAL)
Attest:

EDWARD M. FLETCHER, JR.  WILLIAM E. SCHUYLER, JR.
Attesting Officer  Commissioner of Patents